July 16, 1963 KIYOSHI INOUE 3,098,174
POWER SUPPLY FOR SPARK DISCHARGE MACHINING
Filed April 28, 1961

INVENTOR.
KIYOSHI INOUE
BY
Reynolds & Christensen
ATTORNEYS

United States Patent Office 3,098,174
Patented July 16, 1963

3,098,174
POWER SUPPLY FOR SPARK DISCHARGE MACHINING
Kiyoshi Inoue, 182 Yoga Tamagawa Setagaya-ku, Tokyo, Japan
Filed Apr. 28, 1961, Ser. No. 106,282
9 Claims. (Cl. 315—174)

This invention relates to electric power supply devices for spark discharge machining, and more particularly concerns a new and improved power supply wherein the mounds and craters formed on the work surface as a result of the discharge impulses may be minimized during rapid machining operation and wherein, by appropriate adjustment of the power supply, smooth or finish machining operation may be effected in the same physical set-up of the work piece and electrode and without interrupting the operation of the system. The invention is herein illustratively described by reference to the presently preferred embodiment thereof; however, it will be recognized that certain modifications and changes therein with respect to details may be made without departing from the underlying essentials involved.

An addition object of the invention to provide a practical, inexpensive, simple and reliable power supply capable of performing the described functions.

Still another object is a versatile power supply capable, by appropriate control or adjustment, of satisfying all types of machining requirements, including those requiring rapid removal of metal without necessary regard to smoothness of finish, and those requiring a smooth finish without necessary regard to removal rate.

In accordance with this invention the power supply to which the electrode and work piece are connected comprises means for generating a basic machining waveform comprising recurrent impulses of predetermined duration and magnitude and upon which are superimposed relatively high-frequency fluctuations or impulses, also of predetermined amplitude and of any suitable frequency high in relation to the frequency of recurrence of the basic impulses, together with means in the power supply controllable to vary the relative magnitudes of said basic impulses and said fluctuations. In the preferred embodiment as herein disclosed the last-mentioned controllable means comprises a filter circuit arranged in the connections between the generating means and the electrodes and preferably comprising a condenser connected serially in said connections, and a variable resistance connected in shunt to the condenser. Variations of the resistance setting, which may be effected manually or by automatic means if desired, attenuates the basic impulse wave or component. However, the by-pass condenser permits relatively unattenuated passage of the high-frequency fluctuations through the filter circuit. Consequently, the percentage of energy contained in the high-frequency impulses relative to that contained in the basic waveform of low frequency may be varied by adjustment of the resistance. In this manner the machining rate may be increased by decreasing the resistance value whereas the smoothness of finish imparted by the machining operation may be enhanced by increasing the resistance value.

These and other features, objects and advantages of the invention will become more fully evident from the following description thereof by reference to the accompanying drawings.

Figure 1:
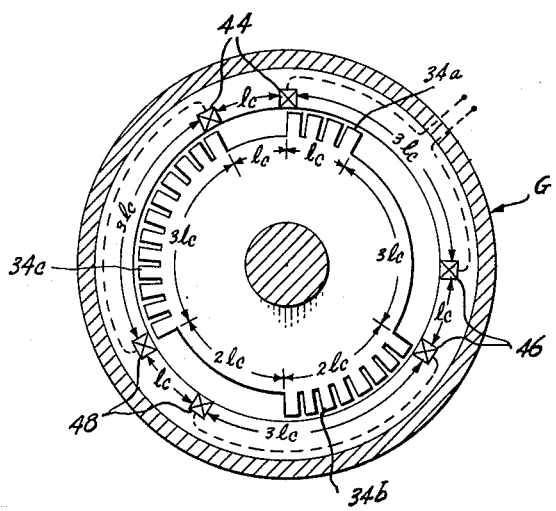
FIGURE 1 is a sectional end view of a rotary type dynamo electric power supply generator capable of generating a waveform suitable for purposes of the invention.
Figure 2:
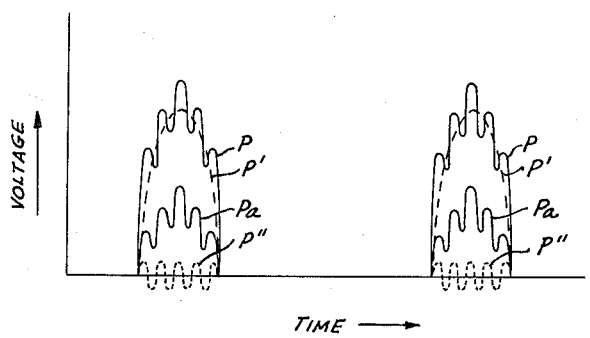
FIGURE 2 is a wave diagram illustrating such waveform.

The rotary dynamo electric impulse generator illustrated in FIGURE 1, in simplified manner, is or may be a variation of the rotary impulse generators disclosed in my copending application Serial No. 813,759, filed May 18, 1959. Reference is hereby made to the disclosure of said patent application for an explanation of the construction and theory of operation of such generators. Parts and components in FIGURE 1 bearing reference numerals similar to those in FIGURE 3, for example, of said copending application may be presumed similar in form and operation. In this instance, however, the salient pole faces 34a, 34b and 34c are provided with a series of slots or teeth which extend lengthwise of the generator (i.e., parallel to the axis) and which represent circumferentially spaced discontinuities in the salient pole faces. As relative rotation occurs between the rotary member 34 and the stator of the generator, which in this case carries the windings 44, 46 and 48, a waveform is generated which includes the basic recurrent low-frequency impulses upon which are superimposed relatively high-frequency fluctuations or ripple components as depicted in FIGURE 2. In FIGURE 2 the impulses P will be seen to comprise the basic waveform component P′, similar to the waveform generated by the generator described in said copending application, and, due to the toothed construction of the salient poles, the superimposed fluctuations or high frequency oscillations P″.

Figure 3:
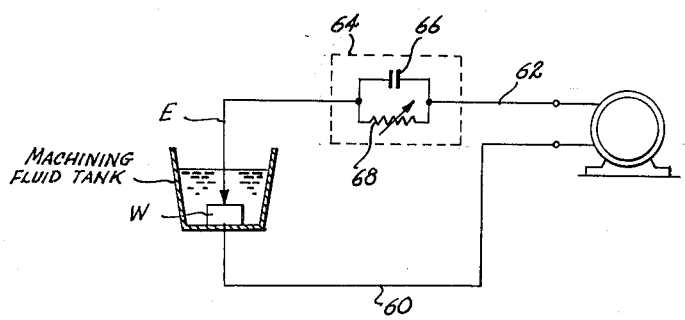
FIGURE 3 is a schematic circuit diagram illustrating the system of the invention, in one form.

In FIGURE 3 the generator G is connected to the work piece W and electrode E through the connecting circuit leads 60 and 62. In one of these leads, such as the lead 62, is serially interposed the filter circuit 64 which comprises in this preferred embodiment a serially connected condenser 66 and a variable resistance 68 connected in shunt to the condenser. With the resistance 68 set at a low value the filter 64 offers relatively little impedance to the waveform P delivered by the generator G to the electrodes. Under these conditions the condenser 66 passes the high-frequency oscillations P″ and the resistance 68 passes the low-frequency impulses P′. The resultant waveform P is of high amplitude and produces relatively rapid machining operation, with some degree of coarseness eliminated by the presence of the superimposed high-frequency impulses P″.

However, as the setting of the resistance 68 is increased the low-frequency component P′ is correspondingly attenuated. This attenuation does not appreciably affect the high-frequency components which continue to pass unattenuated through the coupling condenser 66. As a result the waveform P now appears as Pa in FIGURE 2 in which form it will be seen that the relative energy content of the basic recurring impulse P′ is small and the energy contained in the supermiposed high-frequency oscillations P″ is as great as before the increased resistance setting of element 68. Under these conditions, the mounds and craters produced by the electric discharges on the surface of the work piece are very greatly reduced in size and a comparatively smooth finish results. However, the rate of metal removal is reduced by the fact that the total energy content of the machining impulse is reduced.

It will be evident that in a comparatively simple manner the apparatus of this invention achieves the objectives set forth at the outset herein. It will also be evident that other forms of filtering devices and other specific means may be devised for changing the relative energy content of the basic recurring waveform and the relatively high-frequency component waveform mixed therewith. Nevertheless, the particular embodiment itself by which the invention is illustrated herein constitutes a novel device which in a very simple, effective, inexpensive and reliable manner achieves the desired objectives and comprises an important advance in the art of versatile power supplies for spark discharge machining, which power supplies, by a simple adjustment, can meet or satisfy any of different machining conditions.

I claim as my invention:

1. In combination with an electric discharge machining apparatus including an electrode and work piece, an electric power supply connected to said electrode and work piece to produce a machining discharge across the gap formed therebetween, said power supply comprising means for generating a machining discharge waveform comprising recurring impulses of predetermined duration and magnitude and relatively high-frequency oscillations of predetermined amplitude superimposed on said impulses, and means in said power supply controllable to vary the magnitude of said impulses in relation to the amplitude of said oscillations.

2. In combination with an electric discharge machining apparatus including an electrode and work piece, an electric power supply connected to said electrode and work piece to produce a machining discharge across the gap formed therebetween, said power supply comprising means for generating a machining discharge waveform comprising a mixture of recurring low-frequency impulses of predetermined duration and magnitude and high-frequency impulses of predetermined amplitude, and means in said power supply controllable to vary the relative magnitudes of said low-frequency and high-frequency impulses.

3. The combination defined in claim 2, wherein the relatively high-frequency impulses are superimposed directly on the low-frequency impulses to modify the waveform thereof.

4. The combination defined in claim 3, wherein the power supply comprises an impulse-generating rotary dynamo-electric generator including ferromagnetic pole elements with individual pole faces having a circumferentially spaced succession of discontinuities therein operable to impose relatively high-frequency fluctuations on the basic impulses generated.

5. The combination defined in claim 3, wherein the controllable means comprises a high-pass filter circuit in the circuit connections to the electrode and work piece, said filter circuit including an adjustable low-pass attenuation element.

6. The combination defined in claim 5, wherein the filter circuit includes a condenser and variable resistance connected in parallel, and together disposed serially in said circuit connections.

7. In combination with an electric discharge machining apparatus including an electrode and work piece, an electric power supply connected to said electrode and work piece to produce a machining discharge across the gap formed therebetween, said power supply comprising generator means for generating a machining discharge waveform comprising recurring impulses of predetermined duration and magnitude and relatively high-frequency oscillations of predetermined amplitude superimposed on said impulses, and impedance means interposed serially in the connections between said generator means and the electrode and work piece, comprising a condenser connected in parallel with a variable resistor.

8. In an electric discharge machining apparatus, an electrode and opposing means for supporting a work piece in spark discharge gap relationship to the electrode, a source of discrete time-spaced impulses of a given recurrence rate and polarity, said source including means producing relatively high-frequency oscillations superimposed on said impulses and of lesser amplitude than the impulse magnitude, and circuit means for energizingly connecting said source to said electrode and work piece.

9. The apparatus defined in claim 8, wherein the source comprises a dynamoelectric machine having cooperable stator and rotor members, one such member having winding means and the other having salient ferromagnetic pole elements of respectively different widths circumferentially, producing the recurrent impulses during rotor rotation, and each such element having a series of notches therein producing the superimposed high-frequency oscillations during said rotation.

References Cited in the file of this patent

UNITED STATES PATENTS 2,856,565    Metulaitis _____ Oct. 14, 1958

FOREIGN PATENTS 843,348    Great Britain _____ Aug. 4, 1960